United States Patent

Nakazawa

(10) Patent No.: US 10,698,646 B2
(45) Date of Patent: Jun. 30, 2020

(54) MANAGEMENT APPARATUS AND CONTROL METHOD

(71) Applicant: CANON KABUSHIKI KAISHA, Tokyo (JP)

(72) Inventor: Toshiyuki Nakazawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/056,133

(22) Filed: Aug. 6, 2018

(65) Prior Publication Data

US 2019/0050187 A1  Feb. 14, 2019

(30) Foreign Application Priority Data

Aug. 8, 2017 (JP) .................. 2017-153023

(51) Int. Cl.
*G06F 3/12* (2006.01)
*G06F 11/30* (2006.01)

(52) U.S. Cl.
CPC .......... *G06F 3/1296* (2013.01); *G06F 3/1203* (2013.01); *G06F 3/126* (2013.01); *G06F 3/1231* (2013.01); *G06F 3/1285* (2013.01); *G06F 3/1286* (2013.01); *G06F 11/30* (2013.01); *G06F 3/121* (2013.01)

(58) Field of Classification Search
None
See application file for complete search history.

(56) References Cited

U.S. PATENT DOCUMENTS

| 2013/0173686 A1* | 7/2013 | Hu | G06F 11/3006 |
| | | | 709/202 |
| 2015/0236974 A1* | 8/2015 | Minamitake | H04L 47/726 |
| | | | 709/226 |
| 2018/0293111 A1* | 10/2018 | Chen | G06F 9/4881 |

FOREIGN PATENT DOCUMENTS

JP  2009199458 A  9/2009

\* cited by examiner

*Primary Examiner* — Fan Zhang
(74) *Attorney, Agent, or Firm* — Canon U.S.A., Inc. I.P. Division

(57) ABSTRACT

A management application generates task information including device IDs, the device IDs identifying devices to be subjected to processing according to the task information, generates a plurality of pieces of sub-task information with device IDs of one or more devices subjected to the processing and an agent ID of an agent corresponding to the one or more devices, instructs a plurality of agents to start a task, transmits the sub-task information to the agent corresponding to the agent ID, sets an execution result of a sub-task received from the agent to sub-task information corresponding to the sub-task, and sets, in response to the execution result having been set to all pieces of the sub-task information, an ending date to the task information.

7 Claims, 11 Drawing Sheets

FIG.4

SETTING VALUE ACQUISITION TASK

TASK NAME: | PERIODICAL SETTING VALUE ACQUISITION | ~401

ACQUISITION DATA:
- ☑ NETWORK SETTINGS
- ☐ ADDRESS BOOK   ~407
- ☑ SECURITY SETTINGS

SCHEDULE SETTINGS:

| EVERY WEEK ▼ | ~402

☑ MONDAY  ☐ TUESDAY  ☐ WEDNESDAY  ☐ THURSDAY  ~403
☑ FRIDAY  ☐ SATURDAY  ☐ SUNDAY

TIME: | 8:00 | ~404

DEVICE SELECTION:

| ☐ | NAME | PRODUCT NAME | ADDRESS | ~405 |
|---|------|--------------|---------|------|
| ☑ | MFP-A3SE | MFP-8200 | 172.16.10.124 | |
| ☑ | MFP-A3NE | MFP-3500 | 172.16.10.117 | |
| ☑ | SFP-A3W | SFP-1200 | 172.16.10.127 | |
| ☐ | MFP-B1S | MFP-8100 | 172.18.39.91 | |
| ☑ | SFP-B1E | SFP-2000 | 172.16.39.213 | |

[ RESERVATION ]
   406

MANAGEMENT APPARATUS AND CONTROL METHOD

BACKGROUND

Field

The present disclosure relates to a technique for managing one or a plurality of monitoring apparatuses on each of which an agent capable of monitoring a plurality of devices operates, and managing the devices based on information transmitted from the one or the plurality of monitoring apparatuses.

Description of the Related Art

Japanese Patent Application Laid-Open No. 2009-199458 discusses a system for performing distributed management of devices connected via a network. The system discussed in Japanese Patent Application Laid-Open No. 2009-199458 includes a plurality of management servers for performing management, one of which is a parent management server and the others of which server as child management servers. The parent management server acquires various information about network devices managed by the child management servers from the child management servers.

In a conventional technique, however, a parent management server only collects and displays information about network devices collected by child management servers. In the conventional technique, there has been an issue that the parent management server cannot instruct the child management servers to perform processing on network devices under management.

SUMMARY

Various embodiments of the present disclosure are directed to offering a mechanism in which, even when instructing a plurality of devices under distributed management to perform processing, a management apparatus is able to instruct agents to perform processing on the devices regardless of the processing contents, thus making it possible to efficiently perform processing on the devices.

According to one embodiment, a management apparatus manages one or a plurality of monitoring apparatuses on each of which an agent capable of monitoring one or a plurality of devices operates, and the management apparatus manages the devices based on information transmitted from the one or the plurality of monitoring apparatuses. The management apparatus includes one or more processors, and one or more memories storing instructions that, when executed by the one or more processors, cause the management apparatus to: generate task information including device IDs, the device IDs identifying devices to be subjected to processing according to the task information, generate, based on the task information, a plurality of pieces of sub-task information with device IDs of one or more devices subjected to the processing and an agent ID of an agent corresponding to the one or more devices, manage the task information and the sub-task information, instruct a plurality of agents to start a task, transmit the sub-task information with the agent ID specified therein to the agent corresponding to the agent ID, set the execution result of a sub-task received from the agent to the sub-task information corresponding to the sub-task, and set, when the execution result is set to all pieces of the generated sub-task information, an end date to the task information corresponding to the all pieces of sub-task information.

Further features will become apparent from the following description of exemplary embodiments with reference to the attached drawings.

BRIEF DESCRIPTION OF THE DRAWINGS

FIG. 4 illustrates an example of a screen for generating a reservation task for acquiring a setting value according to the present exemplary embodiment.

DESCRIPTION OF THE EMBODIMENTS

Exemplary embodiments will be described below with reference to the accompanying drawings.

Figure 1:
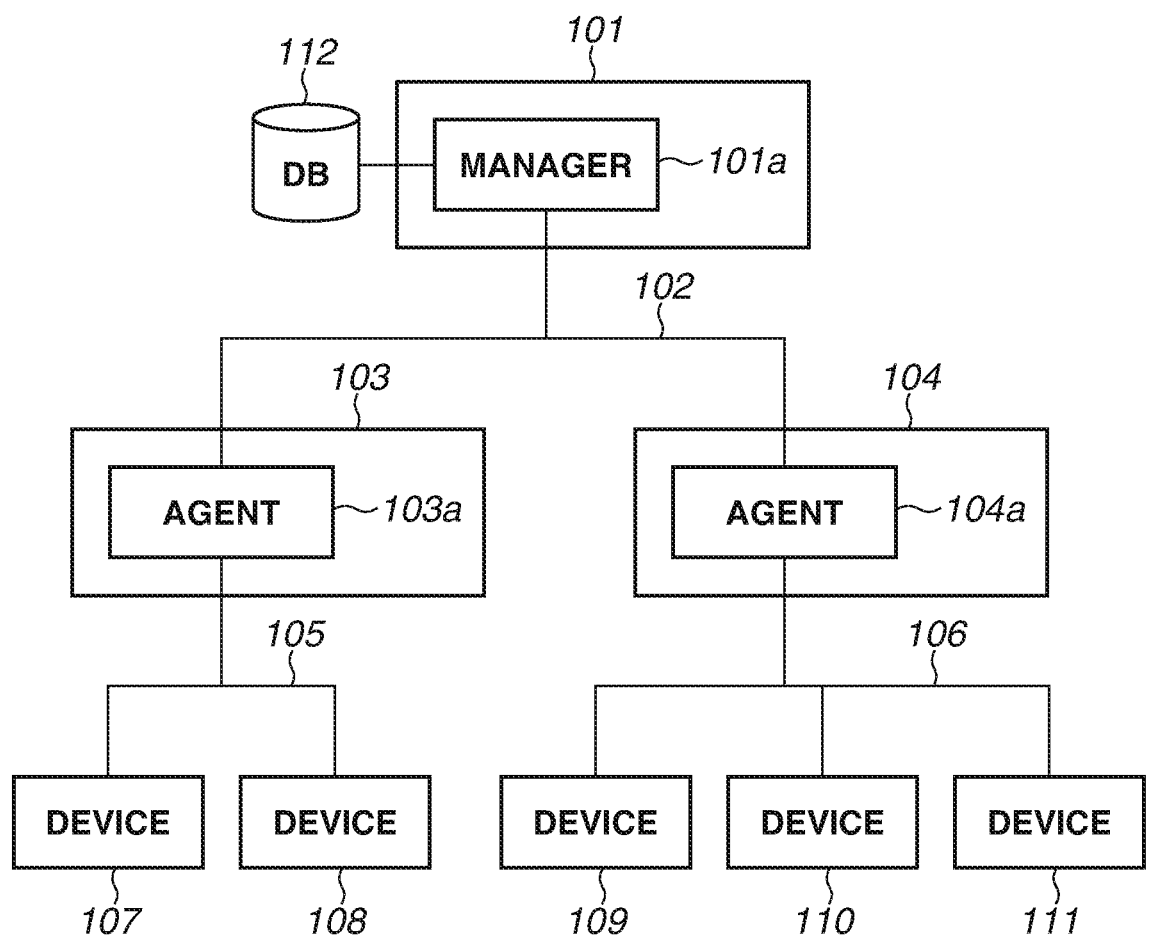
FIG. 1 illustrates a distributed network device management system according to the present exemplary embodiment.

FIG. 1 illustrates an example of a configuration of a distributed network device management system according to an exemplary embodiment.

Referring to FIG. 1, a management apparatus 101 is a server apparatus on which a management application (manager) 101*a* for intensively managing network devices operates. A database (DB) 112 stores data to be managed by the management application 101*a*. The DB 112 may be configured to be implemented in the management apparatus 101 or in other apparatuses capable of communicating with the management apparatus 101. The management apparatus 101 may include one apparatus, a plurality of apparatuses, or a cloud server. For example, the management apparatus 101 can be configured by using public cloud services.

Network devices 107, 108, 109, 110, and 111 are managed by the management application 101*a*. Examples of network devices include image forming apparatuses (such as multifunction peripherals and printers), network cameras, personal computers, various household appliances connected to a network, and vehicles on which a plurality of electronic control devices is mounted. Various household appliances include television sets, refrigerators, and air conditioners. A network device is also simply referred to as a "device".

Monitoring apparatuses 103 and 104 are server apparatus on which agent applications (hereinafter referred to as "agents") 103a and 104a operate, respectively, to monitor network devices. The number of monitoring apparatuses may be one, or three or more. A plurality of network devices can be monitored by one agent. A network administrator prepares at least one agent in consideration of the number of monitoring target devices and a network segment in which devices are installed. In an example illustrated in FIG. 1, the monitoring apparatus 103 monitors the network devices 107 and 108, and the monitoring apparatus 104 monitors the network devices 109, 110, and 111.

One agent and the management application 101a can be implemented on the same server apparatus. When installing an agent, the Uniform Resource Locator (URL) of the management application 101a and information required for authentication can be set to the agent.

The network 102 connects the management apparatus 101 with the monitoring apparatuses 103 and 104. A network 105 connects the monitoring apparatus 103 with the network devices 107 and 108. A network 106 connects the monitoring apparatus 104 with the network devices 109, 110 and 111. The networks 102, 105, and 106 may be independent networks or an identical network.

The agents 103a and 104a cooperate with the management application 101a to monitor (manage) the network devices 107 to 111 through the networks 105 and 106 according to instructions from the management application 101a. The agents 103a and 104a transmit monitoring (management) results to the management application 101a.

The management application 101a receives monitoring (management) results from the agents 103a and 104a and stores the results in the DB 112 as required. The management application 101a manages each agent and each network device in association with each other. In the example illustrated in FIG. 1, the agent 103a is associated with the network devices 107 and 108, and the agent 104a is associated with the network devices 109, 110, and 111. In this way, the management application 101a performs unified management on device information and operation information about all of monitoring target devices, and identification information and connection information about the agents 103a and 104a. The agents 103a and 104a perform device monitoring processing (such as information acquisition, setting distribution, and application distribution) according to a task acquired (received) from the management application 101a. The agents 103a and 104a will be described in detail below.

The monitoring apparatuses 103 and 104 have identical configurations, and the agents 103a and 104a have identical configurations. Therefore, the descriptions of the monitoring apparatus 103 and the agent 103a also apply to the monitoring apparatus 104 and the agent 104a, respectively.

Figure 2:
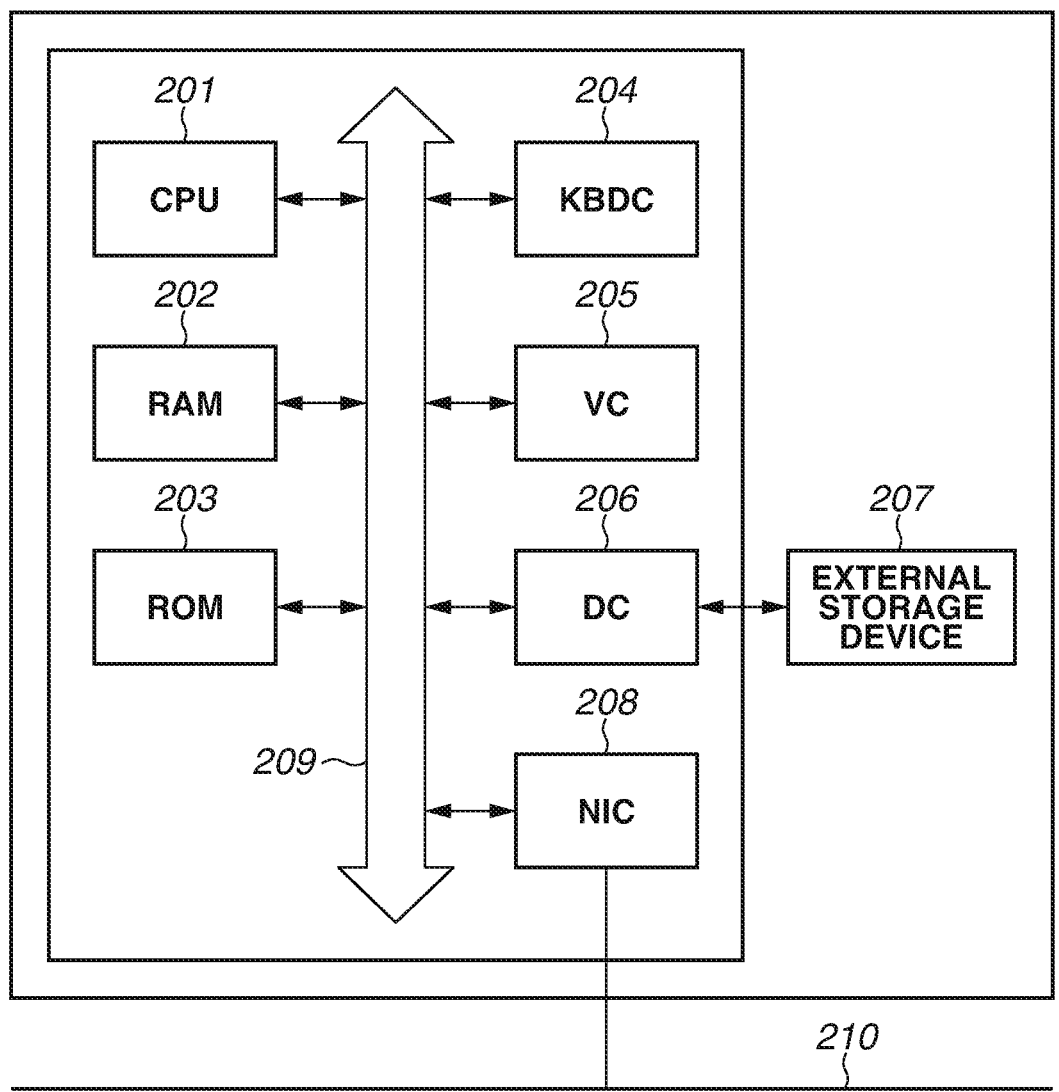
FIG. 2 is a block diagram illustrating an example of a hardware configuration of a host computer.

FIG. 2 is a block diagram illustrating an example of a hardware configuration of a host computer on which the management application 101a, the agents 103a and 104a, and the DB 112 operate.

As illustrated in FIG. 2, the host computer on which the management application 101a, the agents 103a and 104a, and DB 112 operate is an information processing apparatus including a central processing unit (CPU) 201, a random access memory (RAM) 202, a read only memory (ROM) 203, and an external storage device 207.

The CPU 201 executes software stored in the ROM 203 or the external storage device 207 or downloaded from a network 210 to totally control each device connected to a system bus 209. The RAM 202 functions as the main memory of the CPU 201 and a work area.

The external storage device 207 includes a hard disk (HD) and solid-state drive (SSD). The external storage device 207 stores various applications (including a boot program, an operating system, an authentication server, and an authentication client), database data, and user files.

A keyboard controller (KBDC) 204 transmits information input from a keyboard or pointing device to the CPU 201. A video controller (VC) 205 controls display of a display apparatus including a liquid crystal display (LCD). A disk controller (DC) 206 controls access to the external storage device 207. The host computer connects to the network 210 via a communication controller (NIC) 208.

Table 1 illustrates an example of agent information managed by the management application 101a stored in the DB 112.

TABLE 1

| Agent ID | e887bddb-f3a9-404a-a7b6-e27576d0975b |
| Agent name | Tokyo Office |
| IP address | 172.16.10.17 |
| Device address | 172.16.0.0-172.16.255.255 |

Referring to Table 1, "Agent identifier (ID)" is an identifier (Universally Unique Identifier (UUID)) supplied by the management application 101a to uniquely identify each agent. "Agent name" is an arbitrary character string supplied by the user to identify each agent. "IP address" is the Internet Protocol (IP) address of each agent. "Device address" specifies the address of a network device associated with the agent. In an example illustrated in Table 1, network devices having the IP address from 172.16.0.0 to 172.16.255.255 are specified. The device address is represented by a character string including a plurality of ranges each of which is specified with a starting address, a hyphen, and an ending address (for example, 172.20.0.0-172.20.0.255) or a plurality of IP addresses (for example, 172.20.1.10) delimited by one or more commas.

Table 2 illustrates an example of information about a network device to be managed by the management application 101a stored in the DB 112.

TABLE 2

| Device ID | 41124cd1-74f8-4191-8c39-f8027c9c05a2 |
| Agent ID | e887bddb-f3a9-404a-a7b6-e27576d0975b |
| Device name | Color MFP of Personnel Department |
| Product name | MFP-8200 |
| IP address | 172.16.10.124 |
| MAC address | F4:81:39:C4:CA:F7 |

Referring to Table 2, "Device ID" is an identifier (UUID) supplied by the management application 101a to uniquely identify each network device. "Agent ID" indicates the agent ID of the agent associated with this network device. Each network device is associated with an agent based on the device address of the agent. In this case, the agent illustrated in Table 1 is associated with each network device.

"Device name" is an arbitrary character string supplied by the user to identify each network device. "Product name", "IP address", and "MAC address" indicate the product name, IP address, and MAC Address of the network device, respectively.

Processing performed on a plurality of network devices by the management application 101a is generally referred to as a "task". Processing performed on each network device by each agent when processing a task is referred to as a "sub-task". More specifically, a task is composed of a plurality of sub-tasks.

One example of the task is a task for acquiring a list of setting values of a network device. Another example of the task is a task for acquiring the number of sheets that have been printed after shipment in a case where the network device is an image forming apparatus. In this case, the number of printed sheets includes the total number of printed sheets, the number of printed color sheets, the number of printed monochrome sheets, the number of printed double-side sheets, the number of printed one-side sheets, the number of printed double-side color sheets, and the number of printed double-side monochrome sheets. Yet another example of the task is a task for acquiring a network device status. In a case where the network device is an image forming apparatus, examples of statuses include an error status, information of consumables such as toner and photosensitive members, and input information such as the sheet size and the number of remaining sheets in a sheet feed unit.

Figure 3:
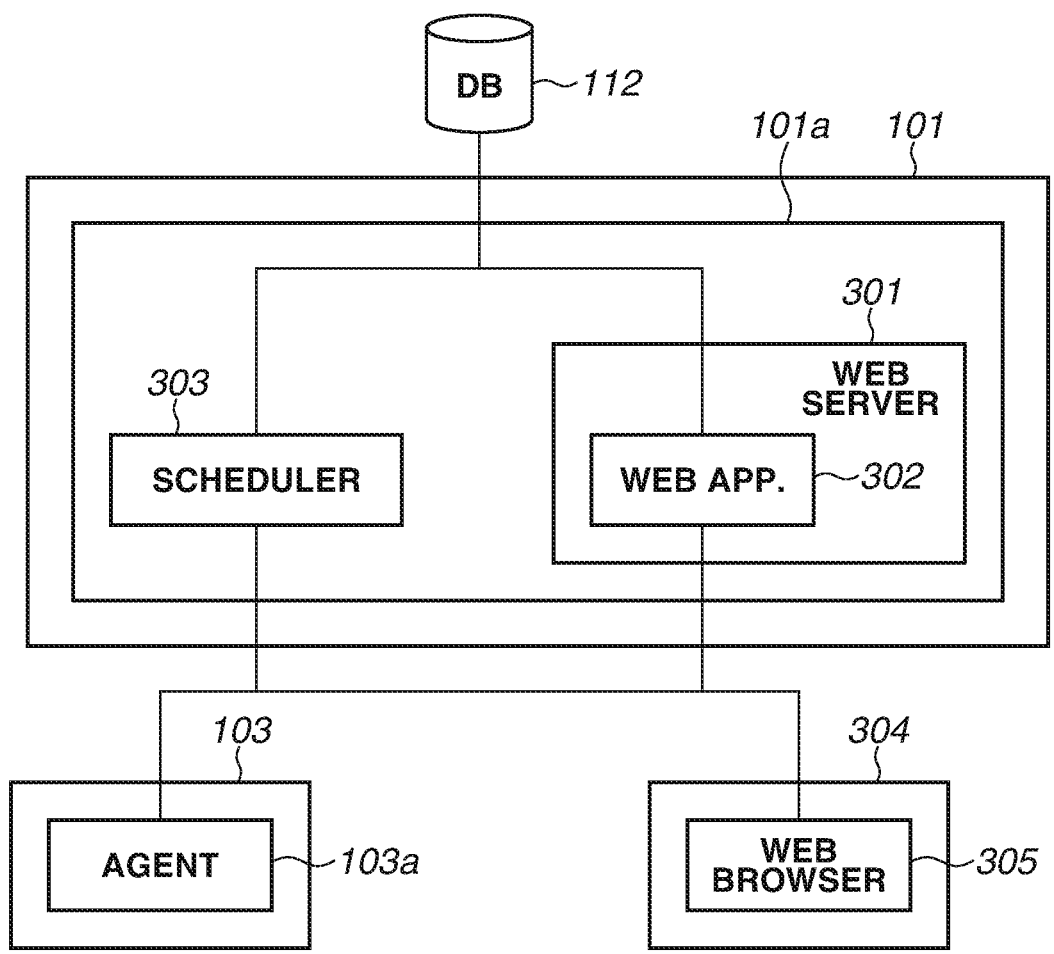
FIG. 3 illustrates an example of a configuration of a management application according to the present exemplary embodiment.

FIG. 3 illustrates an example of a configuration of the management application 101a.

Referring to FIG. 3, a web server 301 operates on the management apparatus 101 on which the management application 101a operates. The management application 101a includes a web application 302 and a scheduler 303.

The scheduler 303 periodically scans the DB 112, prepares for the execution of a reservation task of which the scheduled execution time has elapsed, and instructs the agent 103a to execute the task. A reservation task refers to a set of a task to be executed and an execution schedule added to details of the task. An execution schedule refers to the date and time when the task is to be executed or a periodical execution plan (for example, at 8:00 a.m. on every Monday).

The web application 302 offers a user interface by receiving a request from the user via a web browser 305 operating on a host computer 304 and returning a response. Alternatively, the web application 302 processes a request for transmitting and receiving various data from the agent 103a. Although, in this case, the web browser 305 is used to provide a user interface of the management application 101a, an application using screens of the operating system is also usable.

The following describes a method for executing a task in a distributed management system for devices connected via a network as described above. The present exemplary embodiment will be described in detail below centering on an example of a task for setting value acquisition.

FIG. 4 illustrates an example of a screen displayed on the web browser 305 to generate a reservation task for acquiring a setting value.

Referring to FIG. 4, a task name 401 is a text box used by the user to input a name for identifying each reservation task. Acquisition data 407 includes check boxes for selecting setting values to be acquired from a network device with this task.

User interface (UI) parts 402 to 404 are used to set a task execution schedule (execution timing). In the example illustrated in FIG. 4, the task will be executed at 8:00 a.m. on every Monday and every Friday. The UI parts 402 to 404 allow the user to set a task execution schedule, for example, every day at 3:00 p.m., on a specific date and time, and at 10:00 a.m. on the 1st day of every month. The web application 302 dynamically changes the UI parts 403 and 404 according to a selection of the UI part 402 for selecting an execution period.

A table 405 includes check boxes for selecting network devices from which setting values are to be collected, and a "Reservation" button. When the web application 302 detects that the "Reservation" button 406 is pressed by the user, the web application 302 stores the reservation task data in the DB 112.

Table 3 illustrates an example of reservation task data stored in the DB 112.

TABLE 3

| | |
|---|---|
| Reservation task ID | 5e16e760-f275-4a82-bcd4-a9ee273af6f9 |
| Task class | GetSettings |
| Task name | Periodical setting value acquisition |
| Task details | ["network","security"] |
| Schedule setting | {"recurs":"weekly","dow":[. . .], . . .} |
| Start date and time | 2017 Apr. 29 16:23:00Z |

Referring to Table 3, "Reservation task ID" is an identifier (UUID) supplied by the management application 101a to uniquely identify each reservation task. "Task class" indicates the name of a class on a program for generating, editing, and executing a reservation task. Based on this task class, the web application 302 dynamically generates a class for implementing processing for operating a reservation task editing screen, the scheduler 303 dynamically generates a class for implementing processing for generating task information and sub-task information (described below), and the agent 103a dynamically generates a class for implementing processing for executing the task.

"Task name" indicates the name input in the text box 401 by the user to identify each reservation task. "Task details" indicates details of the task stored in a format interpretable by each task class. For example, when setting values to be collected can be specified, a list of setting value names to be acquired is stored. In an example illustrated in Table 3, the description ["network", "security"] specifies the acquisition of network settings and security settings.

"Schedule setting" indicates an execution schedule of the task. In this example, the task is specified to be repeated every week (detailed specifications of day of week and time are omitted).

"Start date and time" indicates the date and time when the reservation task is to be executed next time according to the schedule setting. For example, when a schedule setting (8:00 a.m. on every Friday) illustrated in FIG. 4 is made and today is Wednesday, the task will be started at 8:00 a.m. on next Friday. The network device subjected to a task is managed based on another table in the database (for example, a table (not illustrated) having a reservation task ID column and an ID column for uniquely identifying a network device). More specifically, the reservation task ID associates the reservation task information illustrated in Table 3 with the device ID of the network device subjected to the task. In this way, the reservation task information illustrated in Table 3 includes the device ID of the network device subjected to the task specified therein.

Figure 5A:
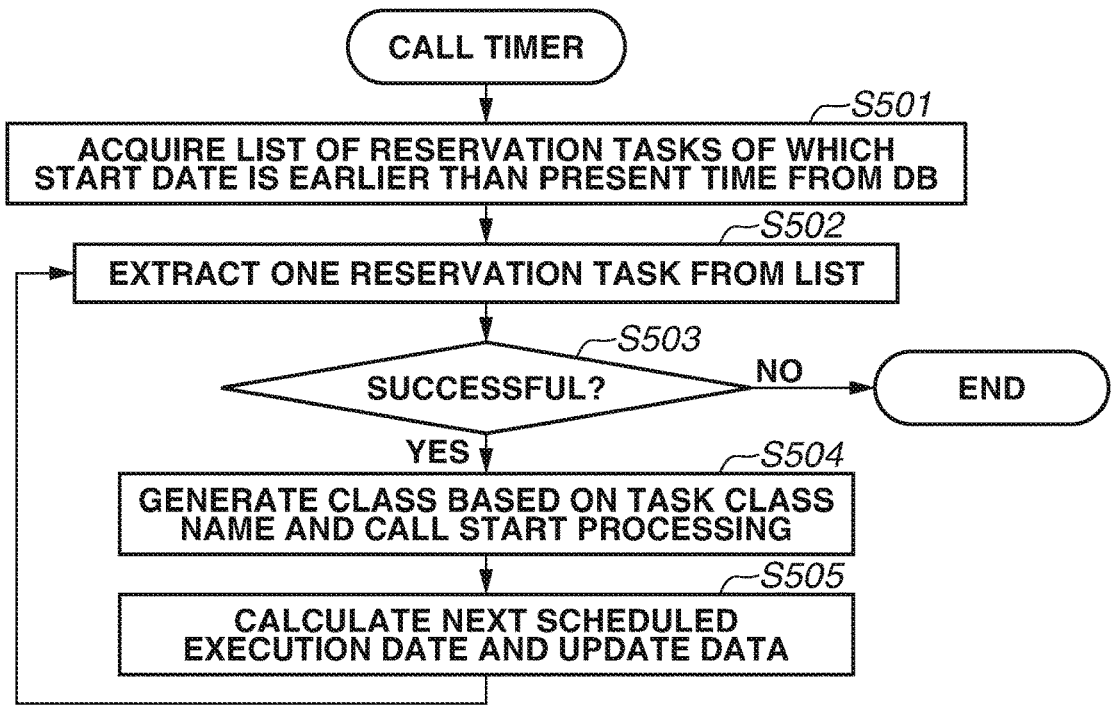
FIGS. 5A and 5B are flowcharts illustrating an example of timer processing and an example of reservation task start processing, respectively, according to the present exemplary embodiment.

FIG. 5A is a flowchart illustrating an example of processing (timer processing) performed by the scheduler 303 to start a reservation task of which the scheduled execution date is earlier than the present time out of reservation tasks in the DB 112. Processing illustrated in FIGS. 5A and 5B (described below) is performed by the management application 101a which is implemented when the CPU 201 of the management apparatus 101 loads a program stored in the external storage device 207 into the RAM 202 and then executes the program.

When the scheduler 303 is activated, the scheduler 303 instructs a timer provided by an operating system (OS) or application execution environment (such as Java Runtime Environment (JRE) and .NET Framework) to periodically call timer processing of the management application 101a illustrated in FIG. 5A. In this way, the timer processing is started.

In the timer processing, in step S501, the management application 101a acquires, from the DB 112, a list of reservation tasks of which the scheduled execution date is earlier than the present time.

In step S502, the management application 101a extracts one unprocessed reservation task from the reservation task list acquired in step S501. Then, the processing proceeds to step S503.

In step S503, the management application 101a checks whether the extraction of a reservation task from the list in step S502 is successful. When the management application 101a determines that the extraction of a reservation task from the list is successful (YES in step S503), the processing proceeds to step S504.

In step S504, according to the task class of the reservation task extracted in step S502, the management application 101a generates a class instance of the class implementing the reservation task start processing and calls the reservation task start processing of the class instance. The reservation task start processing will be described below with reference to FIG. 5B.

In step S505, the management application 101a calculates the next scheduled execution date according to the schedule settings of the reservation task extracted in step S502 and updates the reservation task data in the DB 112. In this case, if the next scheduled execution date does not exist because the task will be executed only once or a periodical execution end date is set, the timer processing sets a far future date (for example, Jan. 1, 9999) as a scheduled execution date. When the reservation task data is updated, then in step S502, the management application 101a shifts to the processing of the next reservation task.

On the other hand, when the management application 101a determines that the extraction of a reservation task from the list has failed in step S502 (NO in step S503), i.e., when the processing is completed for all of reservation tasks acquired in step S501, the management application 101a ends the timer processing.

Figure 5B:
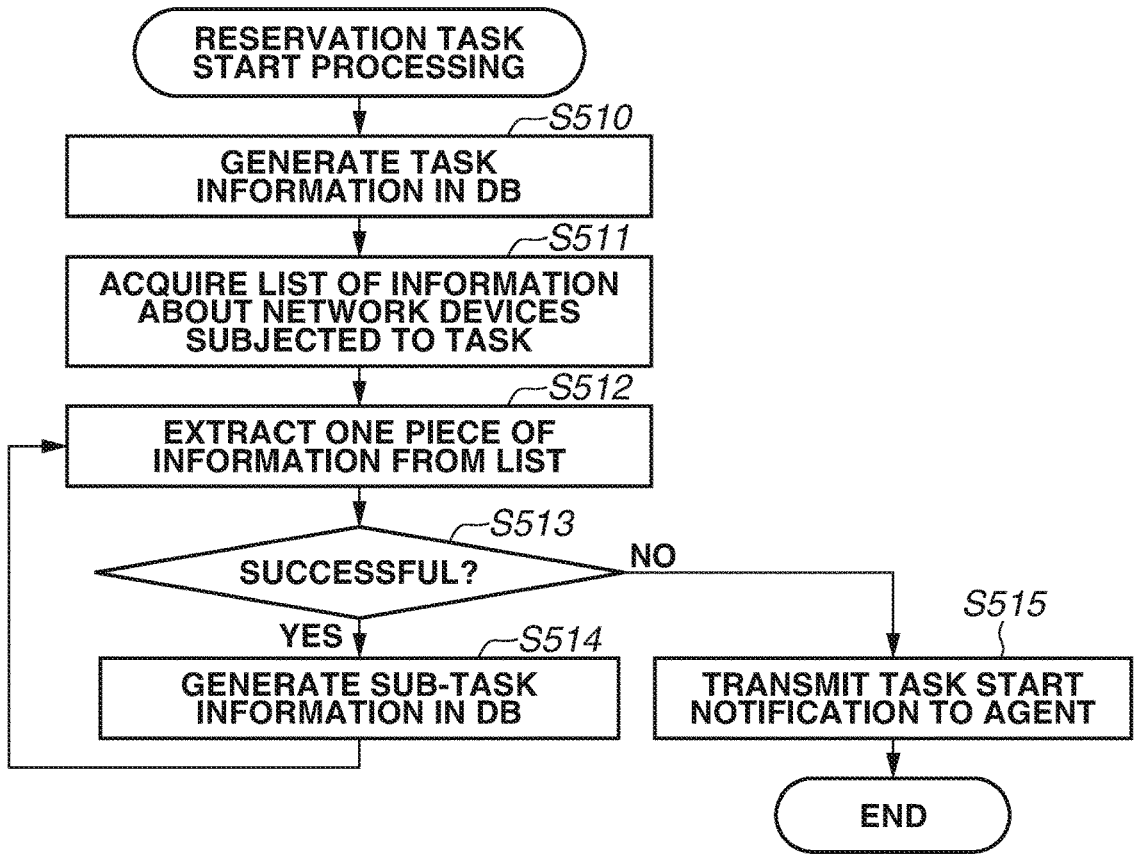

FIG. 5B is a flowchart illustrating the reservation task start processing called in step S504 (hereinafter referred to as "reservation task start processing") in the timer processing illustrated in FIG. 5A. The reservation task starting class inherits from the TaskRunner abstract class (described below) and implements the Start function. The Start function takes the reservation task information as an argument as follows: public abstract class TaskRunner {public void Start (ReservedTask task);}

In the reservation task start processing, in step S510, the management application 101a generates new task information based on the reservation task information (task) transferred as the above-described argument and stores the new task information in the DB 112.

Table 4 illustrates an example of task information to be generated by the reservation task start processing in step S510.

TABLE 4

| | |
|---|---|
| Task ID | b7f35ba6-e908-47d5-8e22-d140474b31e6 |
| Reservation task ID | 5e16e760-f275-4a82-bcd4-a9ee273af6f9 |
| Task class | GetSettings |
| Task name | Periodical setting value acquisition |
| Task details | ["network","security"] |
| Status | RUNNING |
| Start date and time | 2017 Apr. 29 16:23:18Z |
| End date and time | |

Referring to Table 4, "Task ID" is an identifier (UUID) supplied by the reservation task start processing to uniquely identify this task information. "Reservation task ID", "Task class", "Task name", and "Task details" are "Reservation task ID", "Task class", "Task name", and "Task details", respectively, in the reservation task information transferred to the reservation task start processing in step S504 in the timer processing (see FIG. 5A). When task information is generated, the task information is the same as the reservation task information. Since a reservation task may possibly be changed or deleted by the user after the task information is generated, the same data is stored in the task information.

"Status" indicates the task status represented by the task information and is "RUNNING" when the task information is generated. The task status includes "RUNNING", "NORMAL" (processing for all of network devices under management is successful), and "FAILED" (processing for a certain network device has failed). "Start date and time" indicates the date and time when this task information is generated. "End date and time" indicates the date and time when the execution of this task represented by the task information is ended. When the task information is generated, "End date and time" is a blank.

As noted in the description of Table 3, the network device subjected to a task is managed based on another table (for example, a table having a reservation task ID column and an ID (device ID) column for uniquely identifying a network device (not illustrated)) in the DB 112). More specifically, the reservation task ID associates the reservation task information illustrated in Table 4 with the device ID of the network device subjected to the task. In this way, the device ID of the network device subjected to the task is specified in the task information illustrated in Table 4.

In step S511, the management application 101a acquires a list of information about network devices subjected to the reservation task. For example, the management application 101a acquires a list of information about network devices subjected to the reservation task by using the reservation task ID in a table (a table having a reservation task ID column and an ID column uniquely identifying a network device) not illustrated in the DB 112.

In step S512, the management application 101a extracts one piece of unprocessed network device information from the list of information about network devices acquired in step S511.

In step S513, the management application 101a checks whether the extraction of network device information from the list acquired in step S511 is successful. When the management application 101a determines that the extraction of network device information from the list is successful (YES in step S513), the processing proceeds to step S514.

In step S514, the management application 101a generates sub-task information corresponding to the network device information extracted in step S512 and stores the information in the DB 112. Then, the processing proceeds to step S512. A sub-task refers to a unit of task processing decomposed into processing for each network device subjected to a task.

Table 5 illustrates an example of the sub-task information generated by the reservation task start processing in step S514.

TABLE 5

| | |
|---|---|
| Sub-task ID | 729bae26-beb5-4e2a-998f-8baf16af1644 |
| Task ID | b7f35ba6-e908-47d5-8e22-d140474b31e6 |
| Device ID | 41124cd1-74f8-4191-8c39-f8027c9c05a2 |
| Agent ID | e887bddb-f3a9-404a-a7b6-e27576d0975b |
| Sub-task details | |
| Status | READY |
| Execution result | |
| Start date and time | |
| End date and time | |

"Subtask ID" is an identifier (UUID) supplied by the reservation task start processing to uniquely identify this sub-task information. "Task ID" is an identifier for uniquely identifying the task information generated in step S501 illustrated in FIG. 5A, i.e., "Task ID" illustrated in Table 4. "Device ID" is an identifier for uniquely identifying the network device subjected to this sub-task information, i.e., "Device ID" illustrated in Table 2. "Agent ID" is an identifier for uniquely identifying the agent associated with the network device under management, i.e., "Agent ID" illustrated in tables 1 and 2.

"Sub-task details" indicates details specific to this sub-task information interpretable by each class for processing this task. In this example, since details specific to the sub-task information do not exist, "Sub-task details" is a blank. "Status" indicates the status of the sub-task represented by this sub-task information. When the sub-task information is generated, the execution of the sub-task is not started and therefore "Status" is "READY". Sub-task statuses include "READY", "RUNNING", "SUCCESS", "FAILED", "EXCEPTION" (an unexpected error occurred during execution)", and "CANCELED".

"Execution result" indicates the execution result of this sub-task interpretable by each class for processing this task. When a task is generated, the execution is not started and therefore "Execution result" is a blank. "Start date and time" indicates the date and time when the agent will start the sub-task, and "End date and time" indicates the date and time when the agent will end the sub-task. More specifically, the agent ID and the device IDs of a part of the monitoring target devices are specified in the sub-task information illustrated in Table 5.

On the other hand, when the management application 101a determines that the extraction of network device information from the list acquired in step S511 has failed (NO in step S513), i.e., when processing is completed for all pieces of network device information acquired in step S511, the processing proceeds to step S515.

In step S515, the management application 101a instructs each agent to start a task and ends the reservation task start processing. The task start instruction to the agent 103a will be described below.

Figure 6:
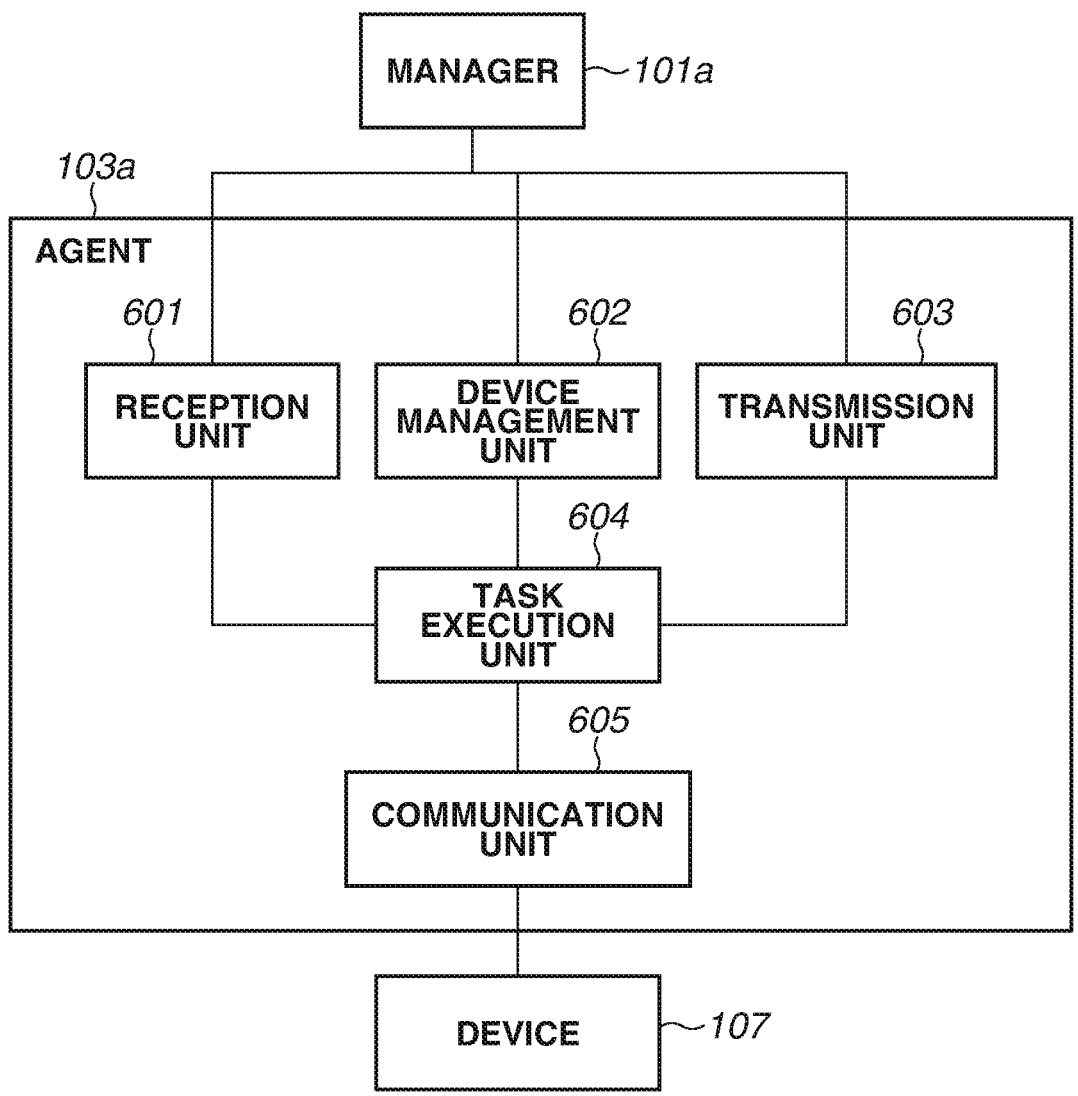
FIG. 6 illustrates a configuration of an agent according to the present exemplary embodiment.

FIG. 6 illustrates a configuration of the agent 103a. More specifically, the configuration of the agent 103a illustrated in FIG. 6 is implemented when the CPU 201 of the monitoring apparatus 103 loads the program corresponding to the agent 103a stored in the external storage device 207 into the RAM 202 and then executes the program.

Referring to FIG. 6, a receiving unit 601 receives an instruction from the management application 101a. For example, the receiving unit 601 includes a Hypertext Transfer Protocol (HTTP)/Hypertext Transfer Protocol Secure (HTTPS) server, receives an HTTP request from the management application 101a, and performs predetermined processing based on the URL and method in the request. This receiving unit 601 receives the "task start instruction to the agent 103a" in step S515 in the reservation task start processing illustrated in FIG. 5B (described in detail below).

The device management unit 602 acquires, from the management application 101a, information about network devices associated with the agent 103a out of network devices managed by the distributed network device management system according to the present exemplary embodiment. The device management unit 602 has a function of searching for information about network devices, for example, by using the device ID. This makes it possible to acquire the IP address of the network device based on the device ID. The device management unit 602 also has a function of managing authentication information used when a communication unit 605 (described below) communicates with a network device. For example, the device management unit 602 manages such information as the user name, context name, authentication protocol and key, encryption protocol and key when connecting with a network device by using Simple Network Management Protocol (SNMP) Version 3.

A transmission unit 603 has a function of transmitting specified data to an address (URL) specified by the management application 101a. The transmission unit 603 also has a function of returning a response to a request transmitted to an address (URL) specified by the management application 101a to a transmission request source.

A task execution unit 604 executes a task for which a task execution instruction is received from the management application 101a. The communication unit 605 performs communication with the network device 107 based on a request from the task execution unit 604. The communication unit 605 communicates with the network device 107, for example, based on SNMP and web services.

Figure 7A:
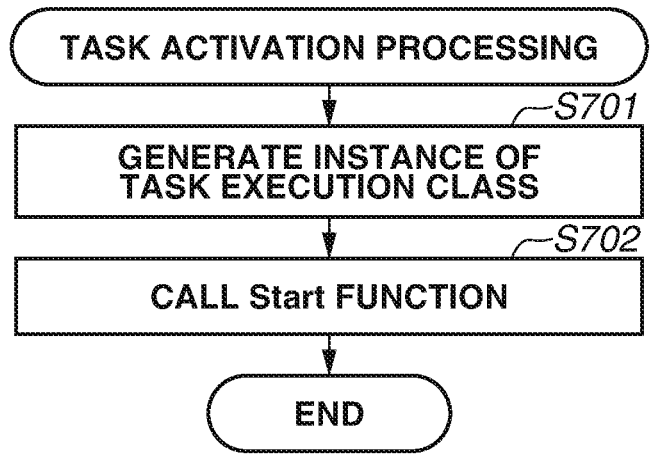
FIGS. 7A and 7B are flowcharts illustrating task activation processing and task start processing, respectively, according to a first exemplary embodiment.
Figure 7B:
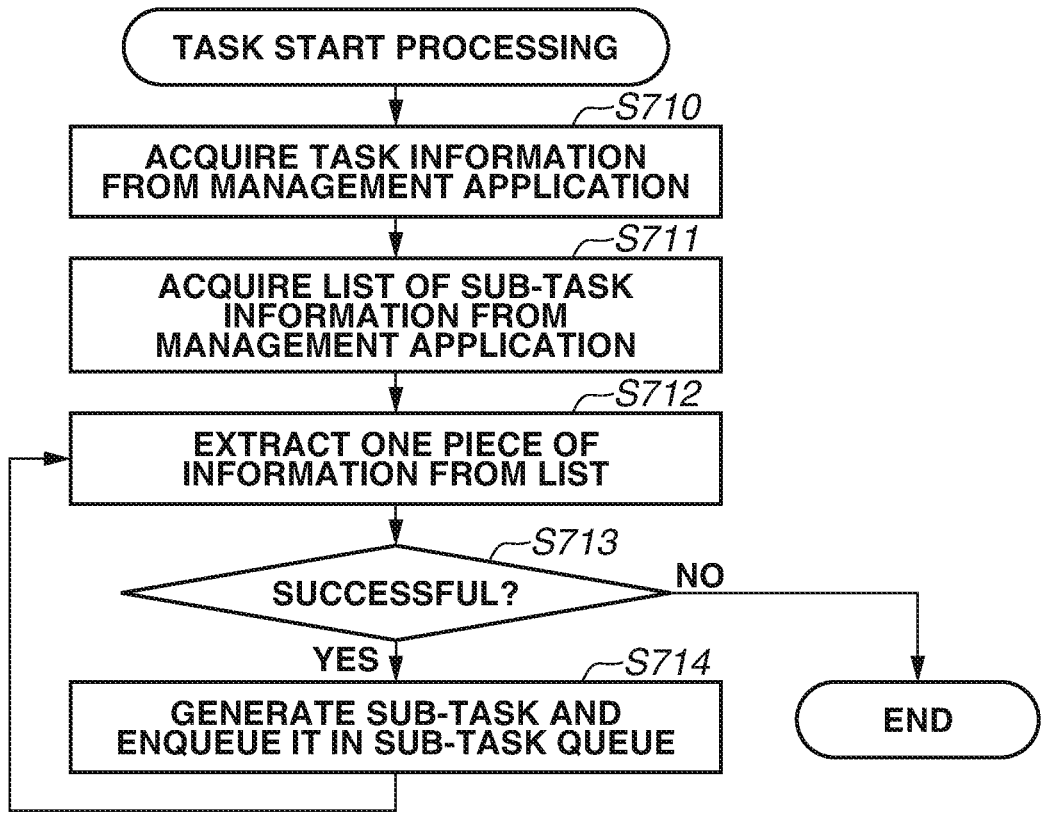

The following describes a flow of task execution processing by the task execution unit 604 of the agent 103a with reference to FIGS. 7A and 7B.

FIG. 7A is a flowchart illustrating a flow of task activation processing executed through the task start instruction in step S515 in the reservation task start processing (see FIG. 5B). Processing illustrated in FIG. 7A and FIGS. 7B, 8, and 9 (described below) is performed by the agent 103a which is implemented when the CPU 201 of the monitoring apparatus 103 loads a program stored in the external storage device 207 into the RAM 202 and then executes the program.

In the reservation task start processing (see FIG. 5B), in step S515, for example, the management application 101a instructs the agent 103a to start a task in the following way. In the reservation task start processing, the management application 101a instructs the agent 103a to start a task by transmitting an HTTP request (including URL path "/API/Task/Start", the POST HTTP method, and the following JavaScript Object Notation (JSON) data as body text).

{ "taskid": "b7f35ba6-e908-47d5-8e22-d140474b31e6",
"taskclass": "GetSettings"}

When the receiving unit 601 of the agent 103a receives the above-described JSON data, the receiving unit 601 converts the received JSON data into an object and calls the task activation processing illustrated in FIG. 7A by using this object as an argument.

In the task activation processing, in step S701, the task execution unit 604 of the agent 103a determines a task execution class based on the task class attribute in the above-described object transferred as an argument and generates an instance of this class. The task execution class inherits from the following TaskBase abstract class. The task execution class implements two different functions, Start and OnSubtaskEnd. In the task activation processing, when the task execution unit 604 generates an instance of the task execution class, the task execution unit 604 sets the task ID in the above-described object transferred as an argument to TaskId of the generated instance.

```
public abstract class TaskBase {
public UUID TaskId;
public void Start ( );
public abstract void OnSubtaskEnd( SubtaskInfo result );
}
```

In step S702, the task execution unit 604 calls the Start function of the instance of the task execution class generated in step S701.

FIG. 7B is a flowchart illustrating a flow of processing of the Start function of the task execution class (task start processing) called in step S702 in the task activation processing.

In the task start processing, in step S710, the task execution unit 604 acquires, from the management application 101a via the transmission unit 603, the task information (see Table 4) specified by the task ID (TaskId) set in the instance and interprets the task details in the task information.

In step S711, the task execution unit 604 acquires, from the management application 101a via the transmission unit 603, a list of the sub-task information (see Table 5) associated with the above-described task ID and the agent 103a.

In step S712, the task execution unit 604 extracts one piece of unprocessed sub-task information from the list of sub-task information acquired in step S711. Then, the processing proceeds to step S713.

In step S713, the task execution unit 604 determines whether the extraction of sub-task information in step S712 is successful. When the task execution unit 604 determines that the extraction of sub-task information in step S712 is successful (YES in step S713), the processing proceeds to step S714.

In step S714, based on the sub-task information acquired in step S712 and the task details acquired in step S710, the task execution unit 604 generates and sets an instance of the sub-task execution class and enqueues the instance in a sub-task queue (not illustrated). The sub-task execution class will be described below. Then in step S712, the task execution unit 604 proceeds to the next sub-task information.

On the other hand, when the task execution unit 604 determines that the extraction of sub-task information in step S712 has failed (NO in step S713), i.e., when processing is completed for all pieces of sub-task information), the task execution unit 604 ends the task start processing.

The above-described sub-task execution class implements the following abstract class. In step S714 in the task start processing (see FIG. 7B), the task execution unit 604 sets the instance of the task execution class (the instance generated in step S701 illustrated in FIG. 7A), the sub-task ID included in the sub-task information, and the device ID to the generated instance of the sub-task execution class. In the sub-task execution processing (described below), the task execution unit 604 further sets information specific to processing for each task to the instance of the sub-task execution class as required.

```
public abstract class SubtaskBase {
public TaskBase Task;
public UUID SubtaskId;
public UUID DeviceId;
public abstract SubtaskInfo Start( );
}
```

As sub-task queuing processing, the task execution unit 604 sequentially extracts, from the sub-task queue, the instances of the sub-task execution class enqueued in the sub-task queue in step S714 in the task start processing (see FIG. 7B). Then, the task execution unit 604 calls the sub-task execution processing illustrated in FIG. 8 by using the extracted sub-task instance as an argument and executes the sub-task.

Figure 8:
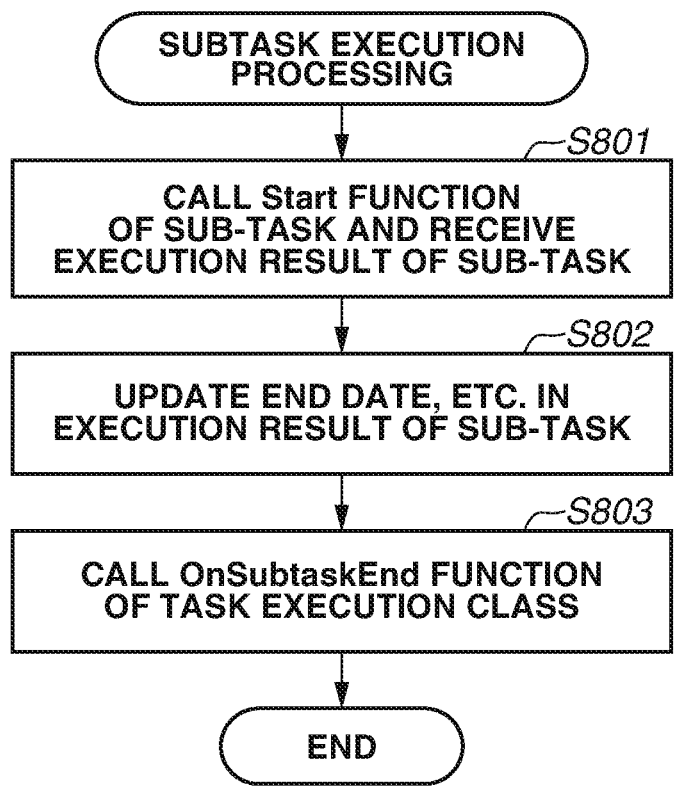
FIG. 8 is a flowchart illustrating an example of sub-task execution processing according to the present exemplary embodiment.

FIG. 8 is a flowchart illustrating a flow processing in the sub-task execution processing.

In the sub-task execution processing, in step S801, the task execution unit 604 calls the Start function of the instance of the sub-task execution class transferred as an argument and receives a sub-task execution result.

The Start function of the sub-task execution class first acquires information about the network devices under management (for example, IP address and authentication information for each protocol) from the device management unit 602 by using the device ID. Then, by using the acquired information about network devices, the Start function of the sub-task execution class performs requested processing on the network devices and returns a sub-task execution result. The sub-task execution result is equivalent to the sub-task information illustrated in Table 5.

In step S802, the task execution unit 604 updates "Task ID", "Sub-task ID", "Device ID", "Start date and time", and "End date and time" in the sub-task execution result received in step S801. "Start date and time" is earlier than the date and time when the Start function of the sub-task execution class is called in step S801. "End date and time" is the present date and time. "Sub-task details", "Status", and "Execution result" are set by the Start function of the sub-task execution class. For example, in the case of a task for acquiring network device setting information, JSON character strings representing setting information acquired from a network device serve as an execution result. Likewise, in the case of a task for acquiring status and consumables information, JSON character strings representing the status and consumables information acquired from a network device serve as an execution result.

Finally, in step S803, the task execution unit 604 instructs the task execution class to end the sub-task execution by calling the OnSubtaskEnd function of the Task attribute of an instance of the sub-task execution class (more specifically, an instance of the task execution class). Typical processing of the OnSubtaskEnd function of the task execution class is to request the transmission unit 603 to transmit the transferred sub-task execution result to a URL for receiving a sub-task execution result of the web application 302 in the management application 101a. The following describes an example of a URL for receiving a sub-task execution result of the web application 302. In this case, the address of a host computer on which the management application 101a operates is assumed to be 172.20.1.11. https://172.20.1.11/api/v1/tasks/subtask/GetSettings The OnSubtaskEnd function of the task execution class requests the transmission unit 603 to transmit the HTTP request (including the POST HTTP method and a sub-task execution result converted into a JSON character string as body text) to this URL.

Figure 9:
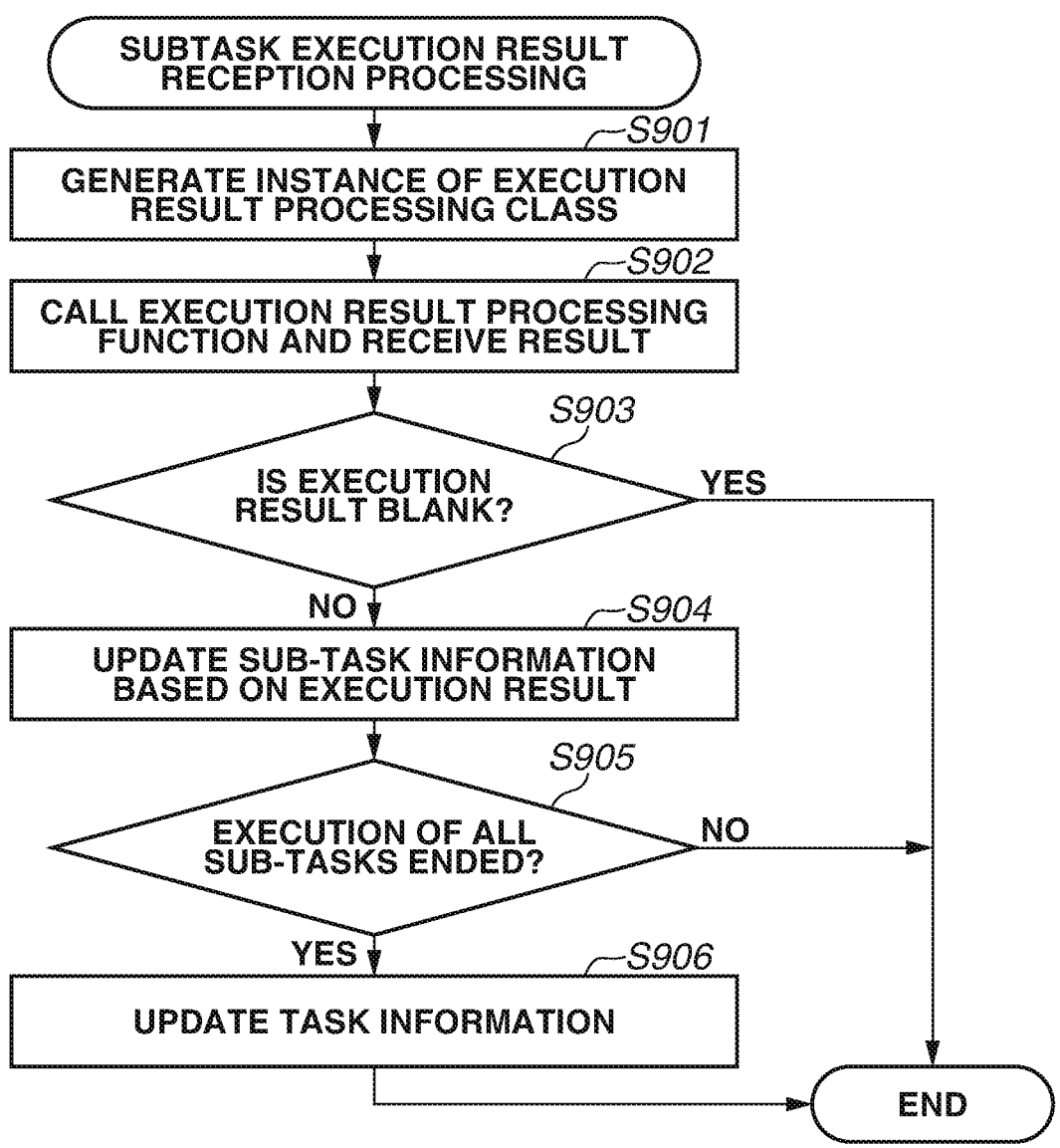
FIG. 9 is a flowchart illustrating sub-task execution result reception processing according to the present exemplary embodiment.

FIG. 9 is a flowchart illustrating a flow of processing (sub-task execution result reception processing) when the web application 302 receives the above-described sub-task execution result transmitted from the transmission unit 603 of the agent 103a.

Upon reception of a HTTP request (the POST HTTP method to URL path "/api/v1/tasks/subtask/class name"), the web application 302 calls the sub-task execution result reception processing illustrated in FIG. 9 by using "class name" and the sub-task execution result included in the request as arguments. For example, in the example of the above-described URL, "class name" is "GetSettings".

In the sub-task execution result reception processing, in step S901, the management application 101a generates an instance of the sub-task execution result processing class that can process this sub-task reception result by using the class name given as an argument. The sub-task execution result processing class is a class which implements the following interface:

```
public interface SubtaskResultHooker {
  SubtaskInfo Hook(SubtaskInfo result);
}
```

In step S902, the management application 101a calls the Hook function of the generated instance of the generated sub-task execution result processing class by using, as an argument, the sub-task execution result transferred as an argument and receives a result.

The Hook function of the sub-task execution result processing class performs processing specific to each task based on the sub-task execution result transferred as an argument, converts the contents of the sub-task execution result as required, returns a result, and then ends. The following describes examples of post-processing specific to each task. For example, a task for acquiring a network device status updates the contents of a table in the DB 112 storing the current status of a network device and, when a new error condition is detected from the last status, transmits, by e-mail, the contents of the error to a mail address specified by the user. For example, when acquiring the usage situation of a network device (values of various counters in a case where the network device is an image forming apparatus), the task updates the contents of the table in the DB 112 which stores statistics of the usage situation.

If the sub-task execution result transferred to the Hook function is information which does not need to be stored as a sub-task execution result in a sub-task information table in the DB 112, the Hook function sets a blank to the execution result attribute in the sub-task execution result and returns a result to the caller.

In step S903, the management application 101a determines the return value of the Hook function. When the management application 101a determines that the return value of the Hook function is a blank (YES in step S903), the management application 101a ends the sub-task execution result reception processing.

On the other hand, when the management application 101a determines that the return value of the Hook function is not a blank (NO in step S903), the processing proceeds to step S904.

In step S904, the management application 101a updates the sub-task information in the DB 112 illustrated in Table 5 by using the sub-task execution result returned from the Hook function.

In step S905, the management application 101a determines whether the execution of all of the sub-tasks associated with the task ID of the received sub-task execution result is completed. For example, the management application 101a acquires the number of pieces of sub-task information, in the DB 112, having the same task ID as the task ID associated with the received sub-task, in which the status is not an end status (SUCCESS, FAILED, EXCEPTION, or CANCELED). When the acquired number is 0, the management application 101a determines that the execution of all of the sub-tasks associated with the task ID of the received sub-task execution result is completed. On the other hand, when the acquired number is not 0, the management application 101a determines that the execution of at least one sub-task associated with the task ID of the received sub-task execution result is not completed.

When the management application 101a determines that the execution of at least one sub-task associated with the task ID of the received sub-task execution result is not completed (NO in step S905), the management application 101a ends the sub-task execution result reception processing.

On the other hand, when the management application 101a determines that the execution of all of sub-tasks associated with the task ID of the received sub-task execution result is completed (YES in step S905), the processing proceeds to step S906.

In step S906, the management application 101a updates "Status" and "End date and time" in the task information in the DB 112 illustrated in Table 4. When the statuses in all pieces of sub-task information having the task ID are "SUCCESS", the status of the task information is "SUCCESS". Otherwise, the status in the task information is "FAILED". After the processing in step S906, the management application 101a ends the sub-task execution result reception processing.

Figure 11:
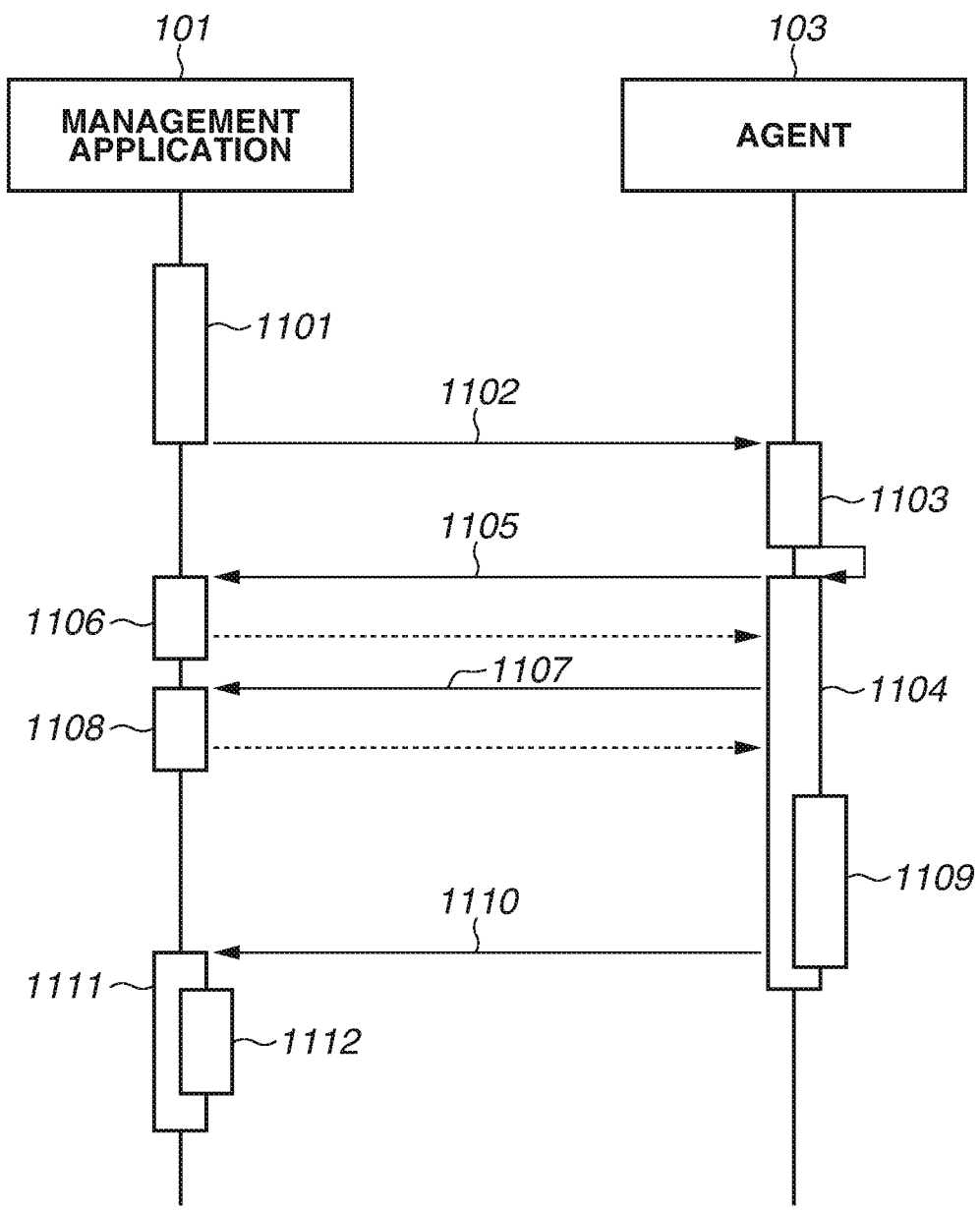
FIG. 11 is a sequence diagram illustrating a processing flow ranging from task start processing to result transmission according to the present exemplary embodiment.

FIG. 11 is a sequence diagram illustrating a flow of processing including task start processing by the management application 101a, task execution by the agent 103a, and result transmission to the management application 101a. Processing of the management application 101a in this sequence diagram is performed by the management application 101a which is implemented when the CPU 201 of the management apparatus 101 loads a program stored in the external storage device 207 into the RAM 202 and then executes the program. Processing of the agent 103a in this sequence diagram is performed by the agent 103a which is implemented when the CPU 201 of the monitoring apparatus 103 loads a program stored in the external storage device 207 into the RAM 202 and then executes the program.

The management application 101a performs the reservation task start processing 1101 illustrated in FIGS. 5A and 5B. The reservation task start processing 1101 generates task information associated with the device ID of the monitoring target device, generates a plurality of pieces of sub-task information with the agent ID and the device IDs of one or more of the monitoring target devices specified therein, and transmits a task start request 1102 to the agent 103a. Although the task start request 1102 is transmitted to a plurality of agents including the agent 104a, the task start request 1102 is not illustrated in FIG. 11 to simplify descriptions.

When the receiving unit 601 receives the task start request 1102, the agent 103a performs task execution processing 1103 illustrated in FIG. 7A. The task execution processing 1103 generates an instance of the task execution class included in the task start request 1102 and calls task start processing 1104 illustrated in FIG. 7B.

The task start processing 1104 transmits a task information acquisition request 1105 having the task information ID included in the task start request 1102 to the management application 101a.

In step S1106, the management application 101a acquires task information having the task information ID included in the task information acquisition request 1105 from the DB 112 and returns this task information.

The task start processing 1104 transmits a sub-task information acquisition request 1107 having the task information ID included in the task start request 1102 and the agent ID of the agent 103a to the management application 101a.

In step S1108, the management application 101a acquires, from the DB 112, a list of sub-task information having the task information ID included in the sub-task information acquisition request 1107 and the agent ID and returns the list of sub-task information.

Based on the acquired task information and sub-task information, the task start processing 1104 generates and sets a class for sub-task execution and calls the sub-task execution processing 1109. The sub-task execution processing 1109 communicates a network device under management specified as required and transmits a sub-task execution result 1110 to the management application 101a. More correctly, the task start processing 1104 transmits the sub-task execution result 1110 returned by the sub-task execution processing 1109 to the management application 101a.

Upon reception of the sub-task execution result 1110, the management application 101a calls the sub-task execution result reception processing 1111 illustrated in FIG. 9. The sub-task execution result reception processing 1111 generates a sub-task execution result processing class based on the class name included in the sub-task execution result 1110 and calls the sub-task execution result processing 1112 (i.e., the Hook function). Finally, the sub-task execution result processing 1112 updates the sub-task information in the DB 112 with the contents of the sub-task execution result returned by the sub-task execution result processing 1112. Each URL used for communication between the management application 101a and the agent 103a and the processing for receiving each request are common regardless of the task type.

As described above, according to the first exemplary embodiment, the management application 101a divides processing into sub-tasks for respective network devices and instructs the agent 103a to start a task. The agent 103a performs each sub-task and transmits a sub-task execution result to the management application 101a. When the management application 101a updates the above-described sub-task information based on the received sub-task execution result and all pieces of sub-task information are updated, the management application 101a updates the task information. In the distributed network device management system, this configuration allows the agent 103a to perform processing (for example, setting value acquisition processing) on network devices from the management application 101a.

Although processing for acquiring information (for example, setting values and operation information) from devices has been described above, the descriptions also apply to processing for distributing setting values to devices and processing for distributing application software to devices.

A second exemplary embodiment will be described below centering on a task for network device search processing (search processing). The search processing transmits a request conforming to SNMP Version 1 having a specified community name to a specified IP address and confirms a response to the request to determine the presence or absence of network device connection. The community name conforming to SNMP Version 1 is common to all tasks, and a range of the IP address to which the request is transmitted is to be specified for each agent.

Table 6 illustrates an example of task information in the case of a task for searching for a network device.

TABLE 6

| | |
|---|---|
| Task ID | 23b1d708-9bbc-4279-81fa-83804002f3c1 |
| Reservation task ID | 14aa2388-b364-442f-9767-b38ce821e612 |
| Task class | Discovery |
| Task name | Network apparatus search |
| Task details | {"communities":["public","secret"]} |
| Status | RUNNING |
| Start date and time | 2017 Apr. 29 16:23:18Z |
| End date and time | |

Table 7 illustrates an example of sub-task information in the case of a task for searching for a network device.

TABLE 7

| | |
|---|---|
| Sub-task ID | 2e7eacc7-00c8-452e-8fec-Cb7762e6e438 |
| Task ID | 23b1d708-9bbc-4279-81fa-83804002f3c1 |
| Device ID | |
| Agent ID | e887bddb-f3a9-404a-a7b6-e27576d0975b |
| Sub-task details | {"addresses":"172.16.0.0-172.16.255.255"} |
| Status | READY |
| Execution result | |
| Start date and time | |
| End date and time | |

Tables 6 and 7 will be described below centering only on differences from Tables 4 and 5.

Referring to Table 6, the task class is "Discovery" which is the class name implementing search processing. "Task name" is "Network device search". "Task details" is an enumeration of community names conforming to SNMP Version 1 when performing search by using SNMP Version 1. The search processing tentatively performs communication conforming to SNMP Version 1 with a network terminal by using the enumerated community names. Since the search processing refers to processing for finding network devices connected to the network, the agent is subjected to a sub-task and therefore there is no information about network devices subjected to a task. The agent subjected to a task is to be managed on another table (for example, a table having the reservation task ID and agent ID columns (not illustrated)) in the DB 112. More specifically, the reservation task information according to the second exemplary embodiment illustrated in Table 6 is associated with the agent ID subjected to the task by the reservation task ID. In this way, the target agent ID subjected to the task is specified in the reservation task information according to the second exemplary embodiment. Referring to Table 7, the device ID of the sub-task information is a blank. In the search processing, a sub-task is generated for each processing target agent.

"Sub-task details" indicates a destination address to which the search processing executed on an agent transmits a search packet conforming to SNMP Version 1. The search processing searches for network devices by transmitting a search packet conforming to SNMP Version 1 to each of the described network addresses. The example illustrated in Table 7 indicates that an SNMP packet is transmitted to each of 65536 IP addresses from 172.16.0.0 to 172.16.255.255.

In the case of a task for searching for a network device, the Start function of the search task execution class operating on the agent 103a, called by the task activation processing in step S701 illustrated in FIG. 7A, performs the search processing and transmits the progress of the search processing to the management application 101a at predetermined intervals. The following describes an example of an execution result when the search processing operating on the agent 103a transmits the progress of the search processing as a sub-task execution result to the management application 101a.

```
{"scanned":18272,
"discovered":18,
"devices":[
{"ip": "172.16.95.117", "name": "MFP-6500",
"mac": "F4:81:28:C8:47:91" },
{"ip": "172.16.110.181", "name": "SFP-2000",
"mac": "F4:81:19:E2:B 1:C9" },
{"ip": "172.16.113.134", "name": "SFP-3500",
"mac": "F4:81:23:AC:BF:45" },
{"ip": "172.16.138.91", "name": "MFP-5500",
"mac": "F4:81:92:BE:F1:1A" }
}]
}
```

"Scanned" indicates the number of addresses on which search has been executed until the transmission of the progress, "discovered" indicates the number of network devices found, and "devices" indicates a list of information about network devices newly found after the last transmission of the progress. At this timing, since processing is not completed for all of the search target IP addresses, the status of the sub-task execution result to be transmitted is "RUNNING" (not illustrated).

In the case of a task for searching for a network device, the execution result processing function of the execution result processing class called by the sub-task execution result reception processing in step S902 illustrated in FIG. 9 performs the following operations.

First of all, the execution result processing function extracts a list of information about searched network devices (the above-described "devices" information) based on the sub-task execution result. Then, for each piece of the extracted network device information, the execution result processing function determines whether there is an entry having the same MAC address in a network device information table in the DB 112. When the execution result processing function determines that such an entry exists, the execution result processing function updates the information in the table in the DB 112 with the received information. When the execution result processing function determines that such an entry does not exist, the execution result processing function adds the received network device information to the network device information table in the DB 112. Then, when processing is completed for all pieces of the received network device information, the execution result processing function returns, to the caller of the function, a new sub-task execution result formed by deleting "devices" from the execution result in the sub-task execution result data transferred as an argument.

Upon completion of the processing of the execution result processing function (NO in step S903), then in step S904, the sub-task execution result reception processing updates the sub-task information based on the sub-task execution result returned from the execution result processing function. At this timing, if processing is completed for all of the search target IP addresses in the sub-task, the sub-task execution result reception processing updates the status in the sub-task information to the end status. When all of the sub-tasks are completed (YES in step S905), then in step S906, the sub-task execution result reception processing updates "Status" and "End date and time" in the corresponding task information.

In the distributed network device management system according to the second exemplary embodiment, the management application 101a is able to allow the agent 103a to perform processing (for example, network device search processing) on network devices.

A third exemplary embodiment will be described below centering on a task for periodically monitoring statuses of network devices under management. In periodically monitoring statuses of network devices, the agent 103a acquires status information from network devices associated with the agent 103a regardless of a notification from the management application 101a and transmits the status information to the management application 101a. Therefore, the task information and sub-task information for monitoring statuses do not exist in a table for storing the task information and sub-task information in the DB 112.

Some of task execution classes that inherit from the TaskBase abstract class have the "AutoStart" attribute indicating that an instance is to be executed when an agent is activated. When the agent 103a is activated, the agent 103a dynamically acquires a list of classes having the AutoStart attribute from task execution classes, i.e., classes that inherit from the TaskBase abstract class, generates instances of these classes, and calls the Start function. A task execution class that inherits from the status monitoring TaskBase abstract class has the AutoStart attribute. Therefore, when the agent 103a is activated, the agent 103a generates an instance of the status monitoring class and calls the Start function.

The Start function of the status management task class sets a timer provided by an operating system (OS) or application execution environment (such as JRE and .NET Framework) to call the monitoring start processing at predetermined intervals.

The monitoring start processing acquires a list of information about network devices associated with the agent 103a from the management application 101a. Then, for each of the acquired network devices, the monitoring start processing generates an instance of the status monitoring sub-task execution class and enqueues the generated instance in the sub-task queue.

The Start function of the status monitoring sub-task execution class which implements the SubtaskBase abstract class acquires the status information from the network device specified in the sub-task information and returns a sub-task execution result.

Table 8 illustrates an example of a sub-task execution result returned by the Start function of the status monitoring sub-task execution class.

TABLE 8

| Sub-task ID | 00000000-0000-0000-0000-000000000000000000000 |
|---|---|
| Task ID | 00000000-0000-0000-0000-000000000000000000000 |
| Device ID | 41124cd1-74f8-4191-8c39-f8027c9c05a2 |
| Agent ID | e887bddb-f3a9-404a-a7b6-e27576d0975b |
| Sub-task details | |
| Status | SUCCESS |
| Execution result | {"alerts":[...],"supplies":[...],"inputs":[...]} |
| Start date and time | 2017 Apr. 29 17:19:38Z |
| End date and time | 2017 Apr. 29 17:21:02Z |

Table 8 will be described below centering only on differences from Table 5.

Referring to Table 8, "Execution result" includes a list of error information, consumables information, and paper feed information of a network device (details are omitted). "Sub-task ID" and "Task ID" are blank UUIDs.

This sub-task execution result is transmitted from the agent 103a to the web application 302 of the management application 101a and then received by the sub-task execution result reception processing illustrated in FIG. 9. In step S902 illustrated in FIG. 9, the sub-task execution result reception processing calls the Hook function of the status monitoring sub-task reception result processing class implementing the SubtaskResultHooker interface. The Hook function generates status information based on the received sub-task execution result, stores the status information in a table for storing the statuses of network devices in the DB 112, and returns a blank execution result. Upon reception of the blank result, the management application 101a determines that the result is a blank (YES in step S903) and ends the sub-task execution result reception processing illustrated in FIG. 9.

In the distributed network device management system according to the third exemplary embodiment, it is possible to allow the agent 103a to perform processing on network devices (for example, processing for monitoring the statuses of network devices).

As described above, in the distributed network device management system according to the first to the third exemplary embodiments, it is possible to allow the agent 103a to efficiently perform processing on network devices.

A fourth exemplary embodiment includes the above-described first exemplary embodiment and a function of continuing task execution when the agent 103a is reactivated (ended and then activated) during task execution by the agent 103a.

Figure 10A:
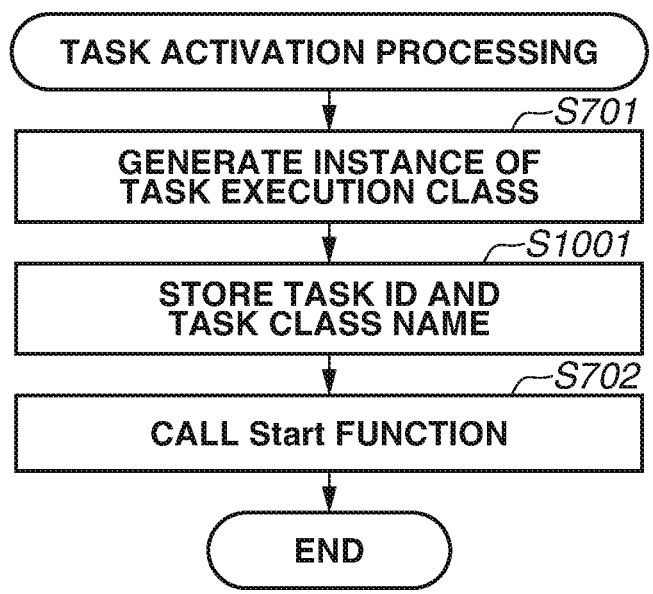
FIGS. 10A and 10B are flowcharts illustrating task activation processing and task reactivation processing, respectively, according to a fourth exemplary embodiment.

FIG. 10A is a flowchart illustrating a flow of task activation processing corresponding to task reactivation according to the fourth exemplary embodiment. Processing illustrated in FIGS. 10A and 10B (described below) is performed by the agent 103a which is implemented when the CPU 201 of the monitoring apparatus 103 loads a program stored in the external storage device 207 into the RAM 202 and then executes the program.

In the task activation processing according to the fourth exemplary embodiment, the task execution unit 604 of the agent 103a generates an instance of the task execution class in step S701. Then, the processing proceeds to step S1001.

In step S1001, the task execution unit 604 stores, in a storage device, a set of [task ID, task class name] transferred to the task activation processing as arguments. The storage device stores, for example, a database in the agent 103a and JSON files representing a list of data having the task ID and the task class name as attributes. Actually, the storage device is the external storage device 207 of the monitoring apparatus 103. In step S1001, if a set of [task ID, task class name] having the same task ID already exists, when saving, the task execution unit 604 overwrites the data. In step S1001, when the task ID is a blank UUID (UUID with all 0s), the task execution unit 604 does not store a set of [task ID, task class name].

Although not illustrated, when processing is completed for all of the sub-tasks associated with the task, the OnSubtaskEnd function of each task execution class deletes, from the storage device, a set of [task ID, task class name] stored in step S1001.

Figure 10B:
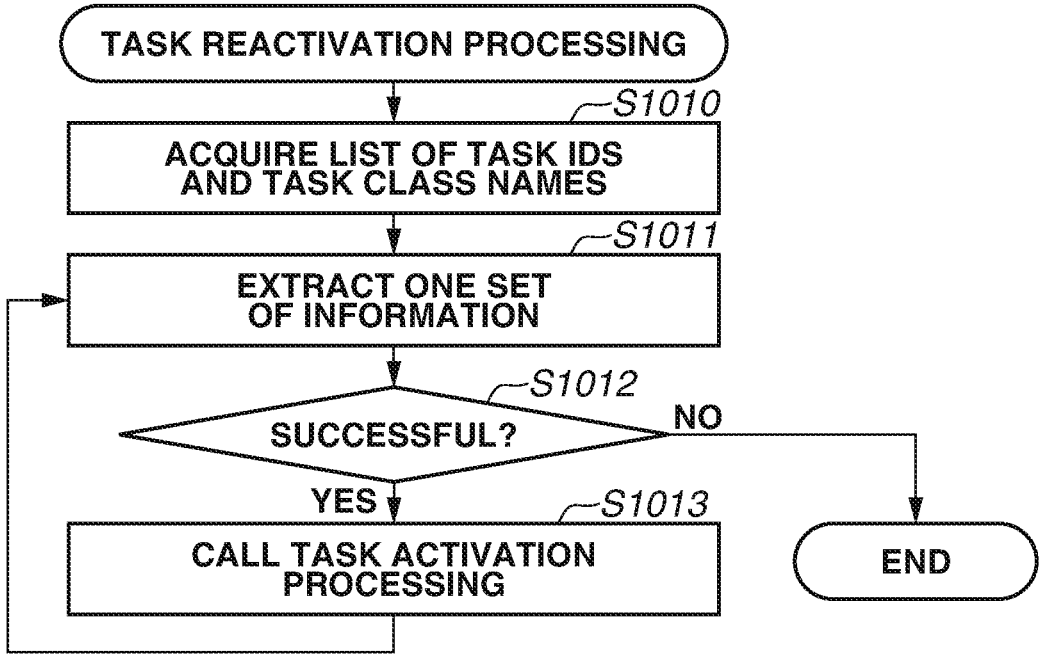

FIG. 10B is a flowchart illustrating a flow of the task reactivation processing which is called by the agent 103a when activated according to the fourth exemplary embodiment.

In the task reactivation processing, in step S1001, the task execution unit 604 acquires, from the storage device, a list of sets of [task ID, task class name] stored by the task activation processing in step S1010 illustrated in FIG. 10A.

In step S1011, the task execution unit 604 sequentially extracts unprocessed sets of [task ID, task class name] from the list acquired in step S1010. Then, the processing proceeds to step S1012.

In step S1012, the task execution unit 604 determines whether the extraction of a set of [task ID, task class name] in step S1011 is successful. When the task execution unit 604 determines that the extraction of a set of [task ID, task class name] in step S1011 is successful (YES in step S1012), the processing proceeds to step S1013.

In step S1013, the task execution unit 604 calls the task activation processing illustrated in FIG. 10A. Then in step S1011, the task execution unit 604 proceeds to processing on the next set of [task ID, task class name].

On the other hand, when the task execution unit 604 determines that the extraction of a set of [task ID, task class name] in step S1011 failed (NO in step S1012), i.e., when processing is completed for all sets of [task ID, task class name], the task execution unit 604 ends the task reactivation processing.

According to the fourth exemplary embodiment, in step S711 in the processing of the Start function of the task execution class (task start processing illustrated in FIG. 7B) called in step S702 in the task activation processing illustrated in FIG. 10A, the sub-task information acquired from the management application 101a is a list of sub-task information having an incomplete status (READY or RUNNING). This prevents the executed sub-task information from being processed again, and sub-tasks not having been executed are processed.

According to the above-described exemplary embodiments, a distributed network devices management system includes one management application and a plurality of agents. The management application is configured to communicate with each agent. Each agent is configured to communicate with the management application and each network device. When collectively performing similar processing on a plurality of network devices, the management application decomposes processing information for each network device into a plurality of pieces of sub-task information in advance. Each agent performs processing on each network device according to each piece of sub-task information and transmits a sub-task execution result to the management application. The management application generates sub-task information based on the received sub-task execution result and updates pre-generated sub-task information with the generated sub-task information. This configuration makes it possible, when performing similar processing on a plurality of network devices, to use common calls between the management application and each agent regardless of the contents of the processing. This configuration makes it easier to manage calls between the management application and each agent and implement processing on the management application and each agent. By checking the status of sub-tasks associated with processing, the progress of the processing can be understood. The above-described configuration also makes it possible to transfer the entire processing on network devices to reduce the load on the management application, thus achieving management of a large number of network devices. Therefore, even when instructing a plurality of devices under distributed management using a plurality of agents to perform processing, the management apparatus 101 is able to instruct agents to perform processing on the devices regardless of the processing contents, thus making it possible to efficiently perform processing on the devices.

While various embodiments have been specifically been described above based on the above-described various data configurations and contents, the present disclosure is not limited thereto but diverse data configurations and contents are applicable according to applications and purposes.

Although the present invention has been described above based on an exemplary embodiment, embodiments of the present disclosure can be embodied, for example, as a system, an apparatus, a method, a program, or a storage medium. For example, the present invention is applicable to both a system composed of a plurality of devices and to an apparatus composed of one device.

Further, all of configurations derived by suitably combining the above-described exemplary embodiments are also intended to be included as embodiments of the present disclosure.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-153023, filed Aug. 8, 2017, which is hereby incorporated by reference herein in its entirety.

What is claimed is:

1. A management apparatus for managing a plurality of monitoring apparatuses on each of which an agent capable of monitoring one or a plurality of devices operates, the management apparatus managing a plurality of devices based on information transmitted from the plurality of monitoring apparatuses, and the management apparatus comprising:
   one or more processors related to a management application;
   one or more memories storing instructions that, when executed by the one or more processors, cause the management apparatus to:
   generate main task information;
   generate, in a case where the generated main task information is first task information for acquiring setting information or for distributing software, a plurality of pieces of sub-task information for each of target devices to be subjected to processing according to the generated main task information,
   wherein, in each of the plurality of pieces of the sub-task information generated based on the first task information, a device ID of one of the target devices and an agent ID of an agent monitoring the one target device are set;
   generate, in a case where the generated main task information is second task information about processing for searching for one or more devices, a plurality of pieces of sub-task information for each of the plurality of agents,
   wherein, in each of the plurality of pieces of the sub-task information generated based on the second task information, an agent ID of one of the plurality of agents is set; and
   transmit the sub-task information with the agent ID specified therein to the agent corresponding to the agent ID,
   wherein, before the first task information is generated as the main task information, a content of processing and the target devices subjected to the processing are designated in advance.

2. The management apparatus according to claim 1, wherein the instructions, when executed, further cause the management apparatus to set a start date to the first task information when the first task information is generated.

3. The management apparatus according to claim 1, wherein, in response to a request from the agent, the sub-task information with the agent ID of the agent specified therein is transmitted to the agent.

4. The management apparatus according to claim 1, wherein, via Hypertext Transfer Protocol (HTTP) or Hypertext Transfer Protocol Secure (HTTPS), a plurality of agents is instructed to start a task, and
   wherein, via the HTTP or the HTTPS, a sub-task execution result is received from the agent.

5. The management apparatus according to claim 1, wherein the instructions further cause the management apparatus to set, in response to an execution result having been set to all pieces of the sub-task information generated based on the first task information, an end date to the first task information.

6. A control method for a management apparatus for managing a plurality of monitoring apparatuses on each of which an agent capable of monitoring one or a plurality of devices operates, and the management apparatus managing a plurality of devices based on information transmitted from the plurality of monitoring apparatuses, the control method comprising:

generating main task information;

generating, in a case where the generated main task information is first task information for acquiring setting information or for distributing software, a plurality of pieces of sub-task information for each of target devices to be subjected to processing according to the generated main task information, wherein, in each of the plurality of pieces of the sub-task information generated based on the first task information, a device ID of one of the target devices and an agent ID of an agent monitoring the one target device are set;

generate, in a case where the generated main task information is second task information about processing for searching for one or more devices, a plurality of pieces of sub-task information for each of the plurality of agents, wherein, in each of the plurality of pieces of the sub-task information generated based on the second task information, an agent ID of one of the plurality of agents is set; and transmit the sub-task information with the agent ID specified therein to the agent corresponding to the agent ID, wherein, before the first task information is generated as the main task information, a content of processing and the target devices subjected to the processing are designated in advance.

7. A non-transitory computer readable storage medium on which are stored instructions which, when executed, cause a computer to execute a control method for a management apparatus, the management apparatus for managing a plurality of monitoring apparatuses on each of which an agent capable of monitoring one or a plurality of devices operates, and the management apparatus managing a plurality of devices based on information transmitted from the plurality of monitoring apparatuses, the control method comprising:

generating main task information;

generating, in a case where the generated main task information is first task information for acquiring setting information or for distributing software, a plurality of pieces of sub-task information for each of target devices to be subjected to processing according to the generated main task information, wherein, in each of the plurality of pieces of the sub-task information generated based on the first task information, a device ID of one of the target devices and an agent ID of an agent monitoring the one target device are set;

generating, in a case where the generated main task information is second task information about processing for searching for one or more devices, a plurality of pieces of sub-task information for each of the plurality of agents, wherein, in each of the plurality of pieces of the sub-task information generated based on the second task information, an agent ID of one of the plurality of agents is set; and transmitting the sub-task information with the agent ID specified therein to the agent corresponding to the agent ID, wherein, before the first task information is generated as the main task information, a content of processing and the target devices subjected to the processing are designated in advance.

* * * * *